United States Patent
Toon (10) Patent No.: US 9,676,474 B2
(45) Date of Patent: *Jun. 13, 2017

(54) SPRING ASSEMBLY FOR AIRCRAFT COMPONENTS

(71) Applicant: The Boeing Company, Chicago, IL (US)

(72) Inventor: Nicholas Toon, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,317

(22) Filed: Aug. 23, 2016

(65) Prior Publication Data

US 2016/0355255 A1 Dec. 8, 2016

Related U.S. Application Data

(62) Division of application No. 14/568,059, filed on Dec. 11, 2014, now Pat. No. 9,440,732.

(51) Int. Cl.
*B64C 25/20* (2006.01)
*B64C 25/26* (2006.01)
*B64C 25/34* (2006.01)
*B64C 25/62* (2006.01)
*F16F 3/04* (2006.01)

(52) U.S. Cl.
CPC ............. *B64C 25/20* (2013.01); *B64C 25/26* (2013.01); *B64C 25/34* (2013.01); *B64C 25/62* (2013.01); *F16F 3/04* (2013.01)

(58) Field of Classification Search
CPC ......... B64C 25/62; B64C 25/58; B64C 25/26; B64C 25/20; B64C 25/18; B64C 25/10; F16F 3/04; F16F 1/06
USPC ....... 267/70, 71, 73, 74, 168, 194, 203, 212, 267/213, 237, 238, 250, 251, 252, 259, 267/290, 291, 293
See application file for complete search history.

(56) References Cited

U.S. PATENT DOCUMENTS

| | | |
|---|---|---|
| 2,665,903 A | 1/1954 | Green |
| 2,959,381 A | 11/1960 | Hartel |
| 3,514,057 A | 5/1970 | Biggs |
| 3,880,414 A | 4/1975 | Smith et al. |
| 4,488,511 A | 12/1984 | Grassano |
| 6,345,583 B1 | 2/2002 | Thackston et al. |
| 6,550,859 B1 | 4/2003 | Andersson et al. |
| 7,163,220 B2 * | 1/2007 | Pappas ............ F16F 1/12 280/149.2 |

(Continued)

*Primary Examiner* — Tien Dinh
*Assistant Examiner* — Richard R Green
(74) *Attorney, Agent, or Firm* — Baker & Hostetler LLP (57) ABSTRACT

A spring assembly elongate along a longitudinal direction includes a first spring that includes a first spring member and a first elongate member that extends from the first spring member along the longitudinal direction. The spring assembly includes a second spring including a second spring member and a second elongate member that extends from the second spring member along the longitudinal direction. The second elongate member extends through the first spring member, and the first elongate member extends through the second spring member such that the first and second spring members are spaced apart with respect to each other along the longitudinal direction.

20 Claims, 5 Drawing Sheets (56) References Cited

U.S. PATENT DOCUMENTS 9,440,732 B2 * 9/2016 Toon .................. B64C 25/20
2011/0204550 A1 8/2011 Pepka

* cited by examiner

SPRING ASSEMBLY FOR AIRCRAFT COMPONENTS

CROSS-REFERENCE TO RELATED APPLICATIONS

This application is a divisional of U.S. patent application Ser. No. 14/568,059, filed Dec. 11, 2014. The disclosure of which is incorporated herein by reference.

FIELD OF THE INVENTION

The present disclosure relates to a biasing assembly for aircraft components, such as landing gear for an aircraft.

BACKGROUND

Springs are used in various aircraft components. For instance, aircraft landing gears are deployed during landing and while taxiing on the runway, and are retracted into compartments inside the aircraft during a flight. Landing gears include a main shock strut that carries a wheel assembly, side braces, locking braces, and springs connected between the side and locking braces, and various actuators that cause deployment and retraction of gears. Such springs are referred to as "downlock" springs because they pull the lock braces over center and into a locked position, locking the side braces into a down and locked position prepared for landing in the event of hydraulic power loss. Typically, a pair of downlock springs are used, each arranged to provide a biasing force between the side and locking braces during deployment and retraction. The need for a pair of springs comes from a safety requirement that requires the down-locking system of springs, however many there are, to function and operate the locking of the side braces in the event of hydraulic power loss or loss of one of springs. This particular spring configuration takes up space, and is prone to failure when the springs are subject to natural frequencies. Further, such springs increase component cost and maintenance complexity.

SUMMARY

An implementation of the present disclosure a spring assembly configured for an aircraft component, such as a landing gear and the like. The spring assembly elongates along a longitudinal direction and includes a first spring that includes a first spring member and a first elongate member that extends from the first spring member along the longitudinal direction. The spring assembly includes a second spring including a second spring member and a second elongate member that extends from the second spring member along the longitudinal direction. The second elongate member extends through the first spring member, and the first elongate member extends through the second spring member such that the first and second spring members are spaced apart with respect to each other along the longitudinal direction.

The features, functions, and advantages that have been discussed can be achieved independently in various embodiments or may be combined in yet other embodiments, further details of which can be seen with reference to the following description and drawings.

BRIEF DESCRIPTION OF DRAWINGS

The foregoing summary, as well as the following detailed description of an exemplary implementations of the present disclosure, will be better understood when read in conjunction with the appended drawings, in which there is shown in the drawings example implementations for the purposes of illustration. It should be understood, however, that the present application is not limited to the precise arrangements and systems shown. In the drawings.

DETAILED DESCRIPTION

Figure 1:
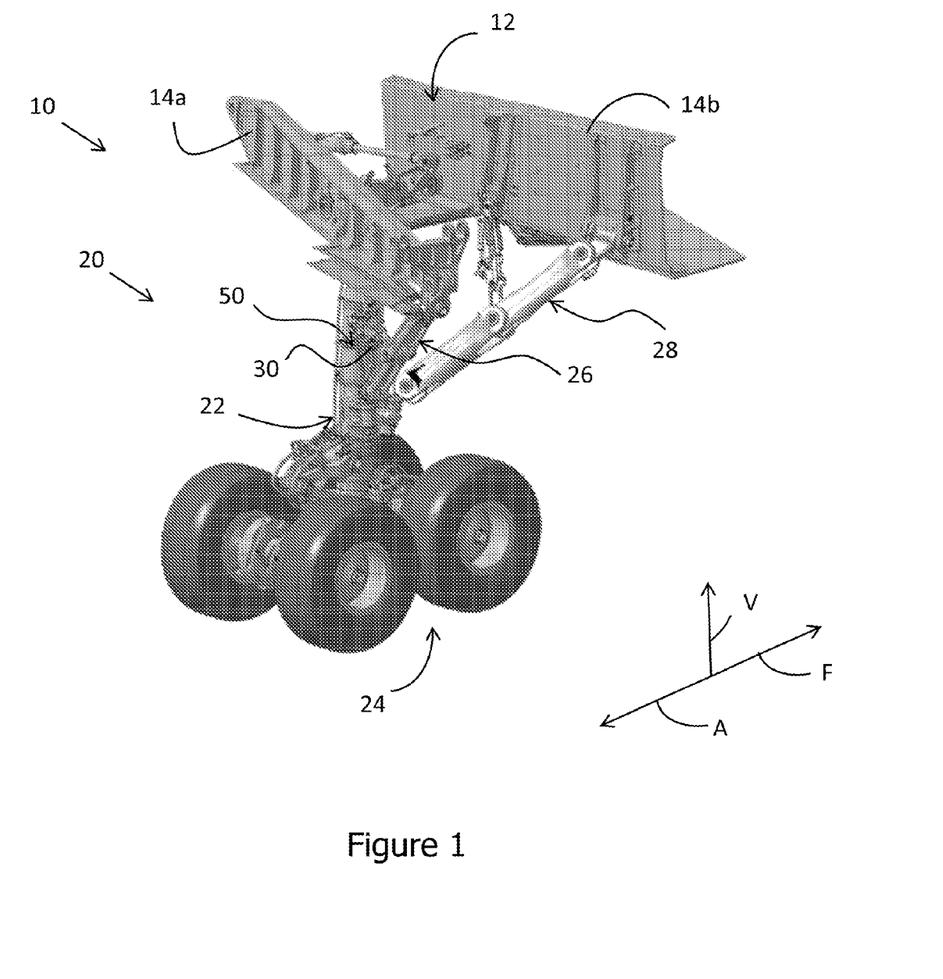
FIG. 1 is a perspective schematic view of a landing gear according to an implementation of the present disclosure.

Referring to FIG. 1, a portion of an aircraft 10 is shown including an aircraft component, such as a landing gear 20. The landing gear 20 is configured to transition between a deployed configuration when the aircraft 10 is landing or taxiing about the runway, and a retracted or in-flight configuration whereby the landing gear 20 is retracted into a compartment 12 in the aircraft 10. In accordance with the example illustrated in FIG. 1, frames 14a and 14b, located in the compartment 12 of the aircraft, partially support the landing gear 20. The landing gear 20 includes a shock strut 22 (sometimes referred to herein as a main support or main member) that carries a wheel assembly 24, a first side brace 26 that is pivotably coupled to the shock strut 22 and the frame 14a, and a locking brace 30 pivotally coupled to the shock strut 22 and the first side brace 26. One or more spring assemblies 50 can be coupled between the locking brace 30 and the first side brace 26. The landing gear 20 also includes a second side brace 28 pivotably coupled to the shock strut 22 and the frame 14b. The second side brace 28 is rotationally offset with respect to first side brace 26 along a forward direction F. The first side brace 26 can be referred to as an aft side brace 26, and the second side brace 28 can be referred to as a drag brace. As is typical, the landing gear 20 includes various actuators configured to transition the landing gear 20 between the deployed configuration as illustrated in FIG. 1 and the retracted configuration. The landing gear 20 illustrated in FIG. 1 is a main landing gear. It should be appreciated that the present disclosure is applicable to a nose landing gear.

Figure 2:
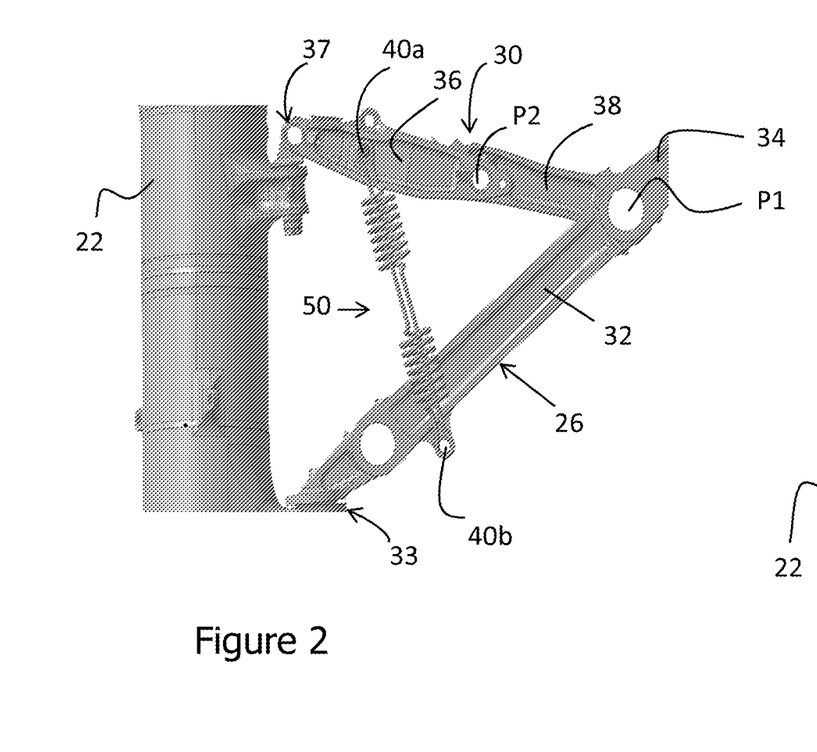
FIG. 2 is a detailed view of a portion of the landing gear shown in FIG. 1, illustrating the landing gear deployed and a spring assembly in a first configuration.
Figure 3:
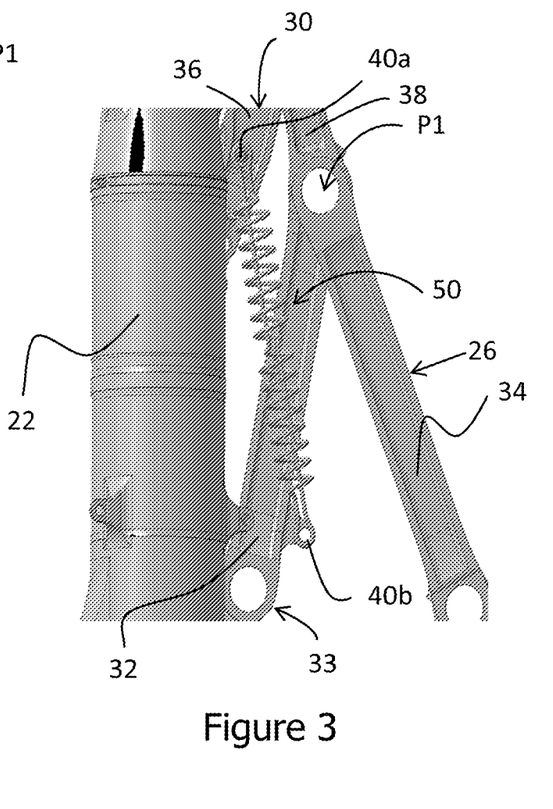
FIG. 3 is a detailed view of a portion of the landing gear shown in FIG. 2, illustrating the landing gear retracted into the landing gear compartment and the spring assembly in a second extended configuration.

FIGS. 2 and 3 illustrate the first side brace 26, locking brace 30, and the shock strut 22 during retraction of the landing gear. The first side brace 26 includes a first arm 32 and a second arm 34 coupled to the first arm 32 at a pivot connection P1. The first arm 32 is coupled to the shock strut 22 at the connector 33 and is further configured to pivot relative to the shock strut 22. The locking brace 30 includes a first leg 36 and a second leg 38 pivotably coupled to each other at pivot connection P2. The first leg 36 is coupled to the shock strut 22 at a connector 37 and the second leg 38 is coupled to the first side brace 26 at the pivot connection P1. A first elongate pin 40a disposed in the aperture or bore (not numbered) of the locking brace 30 is connected to one end of the spring assembly 50. A second elongate pin 40b, similar to the first elongate pin 40a, is supported by the first arm 32 of the first side brace 26. The other end of the spring assembly 50 is connected to the elongate pin 40b.

In operation, as the landing gear 20 transitions from the deployed configuration shown in FIGS. 1 and 2 into the retracted position as shown in FIG. 3, the locking brace 30 pivots toward the shock strut 22 and about the pivot connection P2 such that the first and second legs 36 and 38 collapse into a folded configuration. (Portions of the locking brace 30 are not shown in FIG. 3.) Simultaneously, the first side brace 26 also pivots toward the shock strut 22 while also pivoting about the pivot connection P1 such that the first and second arms 32 and 34 collapse into a folded configuration. Because the connector 37 has been displaced relative to the connector 33 along a length direction (not shown) of the shock strut 22, the spring assembly 50 is extended into the second extended configuration and biasing forces are applied to the elongate pins 40a and 40b. The forces applied to the elongate pins 40a and 40b are transferred to the first leg 36 of the locking brace 30 and the first arm 32 of first side brace 26, respectively. When the landing gear is deployed, the locking brace 30 and side brace 26 pivot about respective pivot connections P2 and P1 and the connector 37 is displaced back toward the connector 33. The spring assembly 50 retracts into its initial configuration. Although not shown in FIGS. 2 and 3, the second side brace 28 collapses into a folding configuration as the landing gear is retracted.

Figure 9A:
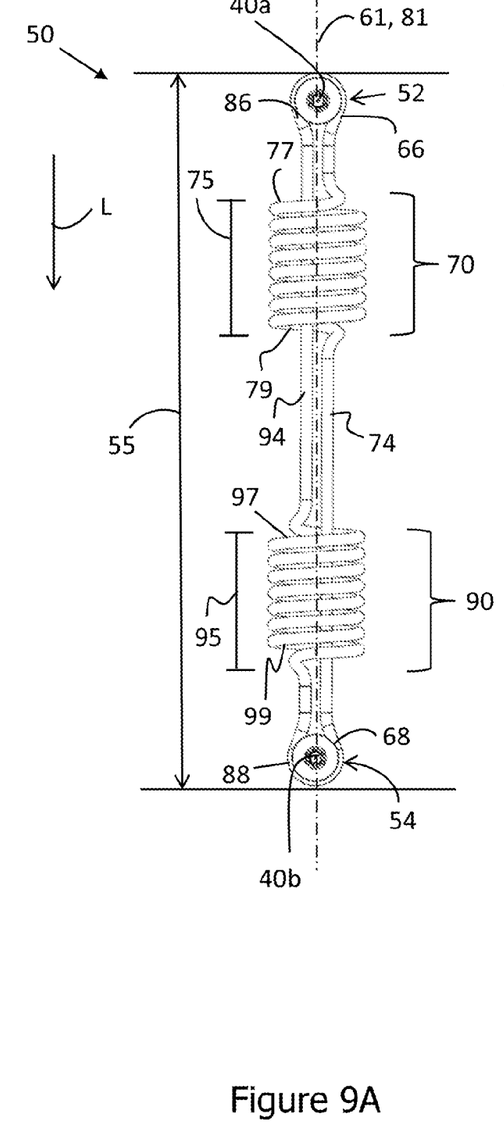
FIGS. 9A and 9B are side views of the spring assembly in the first configuration and the second extended configuration, respectively.
Figure 9B:
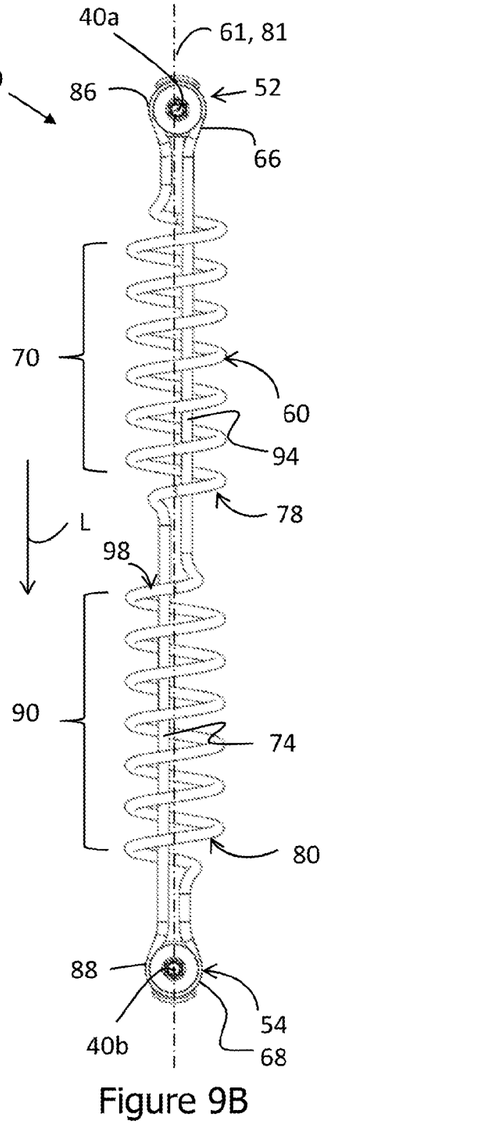

Turning now to FIGS. 9A and 9B, the spring assembly 50 is configured to transition between the initial configuration as shown in FIG. 9A and the second extended configuration as shown in FIG. 9B. The spring assembly 50 has a first assembly end 52, a second assembly end 54 spaced apart from the first assembly end 52 along a longitudinal direction L, and an assembly length 55 that extends from the first assembly end 52 to the second assembly end 54. The assembly length 55 increases as the spring assembly 50 transitions into the extended configuration. The first assembly end 52 can be coupled to the elongate pin 40a, which is secured to the locking brace 30 (shown in FIG. 2). The second assembly end 54 can be coupled to the elongate pin 40b, which is secured to the first side brace 26 (also shown in FIG. 2) as noted above.

Figures 4, 6:
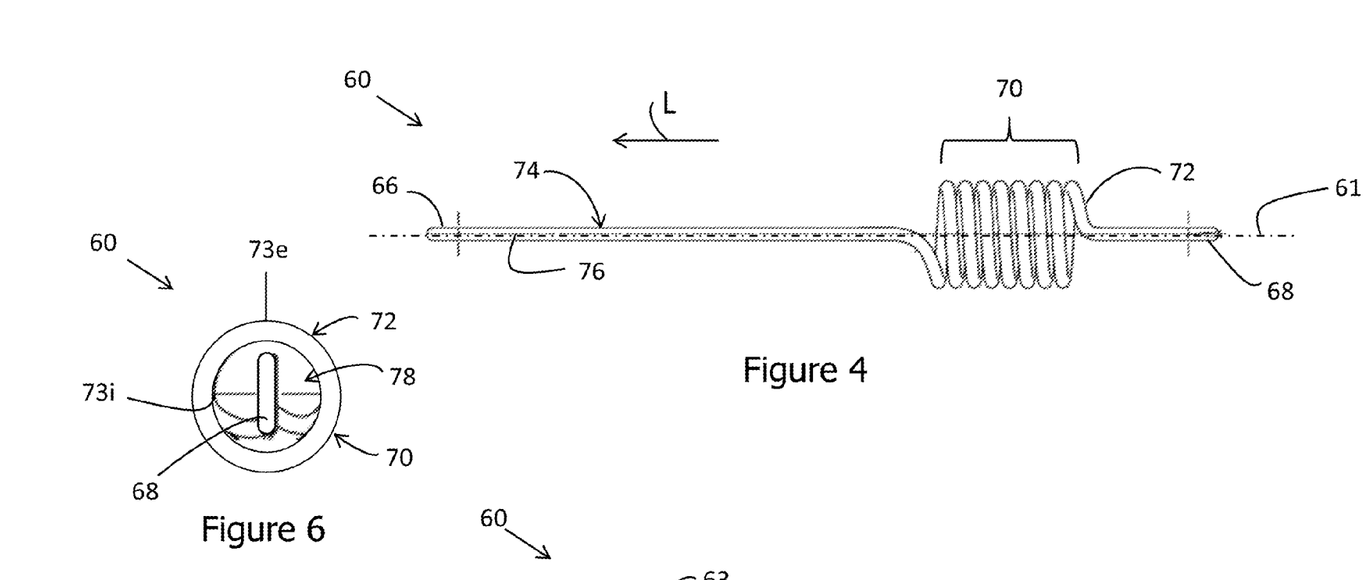
FIGS. 4, 5, and 6 are top, side, and end views, respectively, of one of the springs in the spring assembly illustrated in FIGS. 2 and 3.
Figure 5:
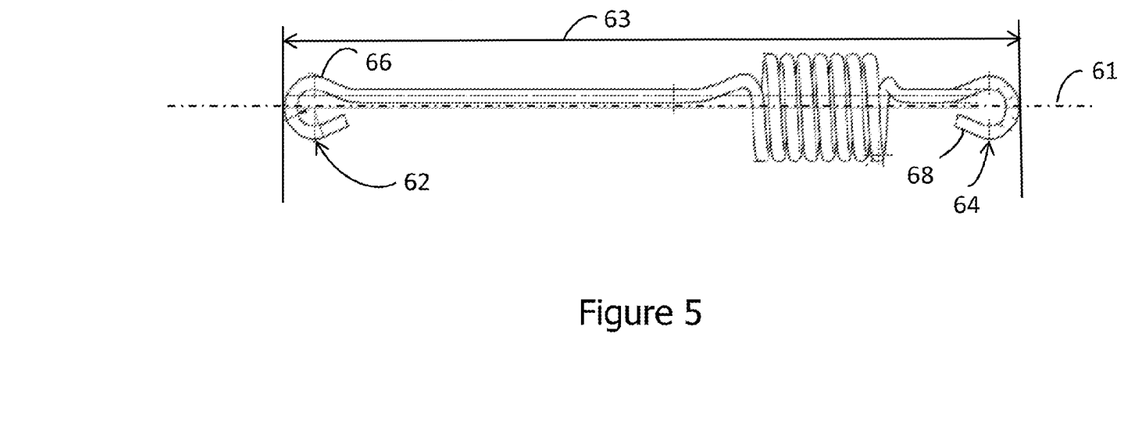

Referring to FIGS. 4-6, the spring assembly 50 includes at least a first spring 60 and a second spring 80 that are configured similarly to each other. The first spring 60 includes a first spring member 70 and a first elongate member 74 that extends linearly from the first spring member 70 along a longitudinal direction L. The first spring 60 includes a first end 62 and a second end 64 spaced from the first end 62 along a central axis 61 that is aligned with and parallel to the longitudinal direction L. The first spring 60 has a first or at-rest length 63 that extends from the first end 62 to the second end 64 along the axis 61. Attachment members 66 and 68, illustrated as hooks, are disposed at the opposed first and second ends 62 and 64, respectively, and are configured to attach directly or indirectly to the side or locking brace.

Continuing with FIGS. 4-6, the first spring member 70 as illustrated includes a helical body 72 that includes a plurality of coils that wind around the central axis 61. In accordance with the illustrated example, the helical body 72 includes up to 7.5 right-hand wound coils. It should be appreciated that more or less coils can be used. In addition, either right-hand wound coils or left-hand wound coils could be used. The helical body 72 includes an exterior side 73e, an interior side 73i, and an interior space 78, which may be defined at least partially by the interior side 73i of the helical body 72.

As shown in FIGS. 4 and 5, the first elongate member 74 is an elongate rod or wire that extends from the first spring member 70 to the attachment member 68 along the longitudinal direction L. The first elongate member 74 includes a rod body 76 that extends along a rod axis (not shown) that is offset with respect to central axis 61 of the first spring 60. It should be appreciated that the first spring member 70 and first elongate member 74 can be configured as a monolithic rod or wire.

Figure 7:
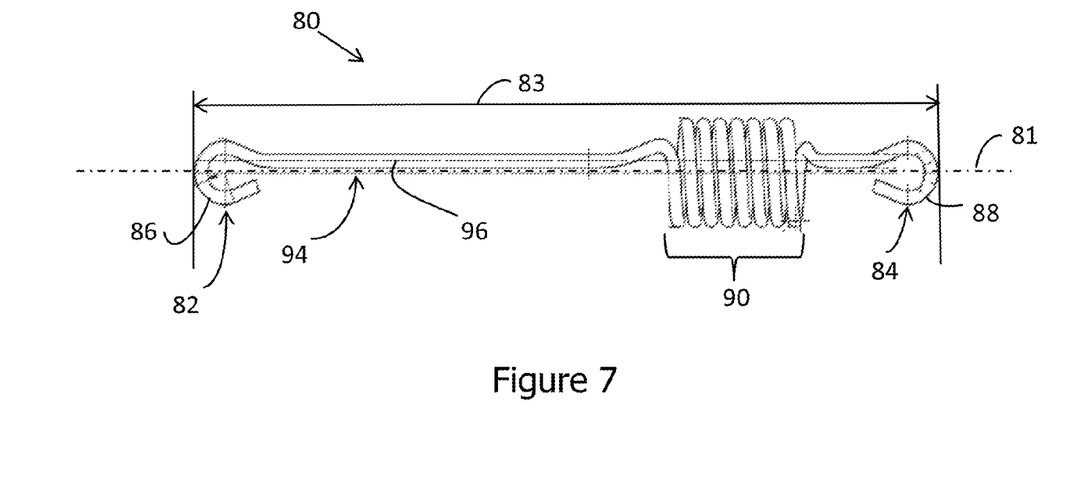
FIGS. 7 and 8 are top and end views, respectively, of the other spring in the spring assembly illustrated in FIGS. 2 and 3.
Figure 8:
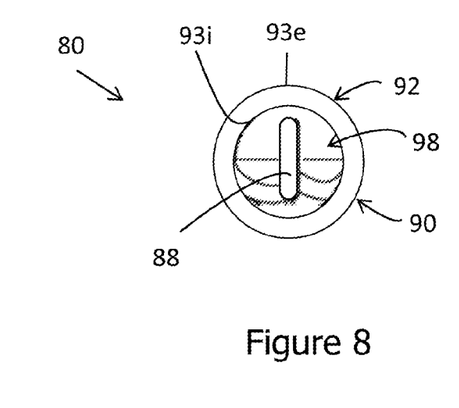

The second spring 80 is shown in FIGS. 7 and 8. The second spring 80 includes a second spring member 90 and a second elongate member 94 that extends linearly from the second spring member 90 along the longitudinal direction L. As illustrated, the second spring 80 includes a first end 82 and a second end 84 spaced from the first end 82 along a central axis 81 that is aligned with a parallel to the longitudinal direction L. The second spring 80 has a first or at-rest length 83 that extends from the first end 82 to the second end 84 along the axis 81. Attachment members 86 and 88, illustrated as hooks, are disposed at the opposed first and second ends 82 and 84 and are configured to attach directly or indirectly to the side or locking brace.

The second elongate member 94 may be an elongate rod or wire that extends from the second spring member 90 to the attachment member 88 along the longitudinal direction L. The second elongate member 94 includes a rod body 96 that extends along a rod axis (not shown) that is offset with respect to central axis 81 of the second spring 80. It should be appreciated that the second spring member 90 and second elongate member 94 can be configured as a monolithic rod or wire.

The first and second springs 60 and 80 are arranged in the spring assembly 50 so that the first elongate member 74 extends through and does not contact the second spring member 90 and the second elongate member 94 extends through and does not contact the first spring member 70. Further, the first and second springs 60 and 80 are not directly attached to each other. As illustrated, the first and second springs 60 and 80 are independently coupled to the elongate pins 40a and 40b as noted above. The spring assembly 50 may include an optional coupler 56 positioned along the elongate members of each coil so to prevent the first and second elongate members 74 and 94 from the contacting each other. As illustrated, the attachment members 86 and 88, illustrated as hooks, are rotatably attached to the elongate pins 40a and 40b. As the first side brace 26 and locking brace 30 transition into their respective folded configurations, the attachment members 86 and 88 rotate around the elongate pins 40a and 40b as the spring assembly 50 is flexed into the extended configuration. While hooks are illustrated, the attachment members may be other devices configured to connect to the elongate pins 40a and 40b or first side brace 26 and locking braces 30.

The second spring member 90 is similar to the first spring member 70. Specifically, the second spring member 90 includes a helical body 92 defining a plurality of coils that extend around the central axis 81. In accordance with the illustrated example, the helical body 92 includes up to 7.5, right-hand wound coils. The windings can be right-hand or left-hand coils as needed. The helical body 92 includes an exterior side 93e, an interior side 93i, and interior space 98 defined at least partially by the interior side 93i of the helical body 92.

Referring now to FIG. 9B, when first and second springs 60 and 80 are arranged in the spring assembly 50 the first and second elongate members 74 and 94 extend through interior spaces 78 and 98 of the first and second springs 60 and 80, respectively. Further, each elongate member 74 and 94 is offset from the central axes 61 and 81 of the other elongate member. Because each spring 60 and 80 is similar, for example each has similar helical bodies and the elongate members 74 and 94 extend through respective spring members 70 and 90, space utilization is improved without compromising landing gear integrity. Such similarities also maximize part utilization in the landing gear assembly, which can result in cost savings.

Continuing with FIGS. 9A and 9B, the first and second spring members 70 and 90 elongate when one or both of the first and second assembly ends 52 and 54 are subjected to a pulling force. As illustrated, the first spring member 70 defines a spring length 75 that extends from its first outer segment 77 to its second outer segment 79 along the longitudinal direction L. In addition, the second spring member 90 defines a spring length 95 that extends from its first outer coil segment 97 to its second outer segments 99 along the longitudinal direction L. Each respective spring member length 75 and 95 can be no greater than half of the assembly length 55 when in the extended configuration. In certain examples, the individual spring lengths 75 and 95 are no greater than about 25% of the assembly length 55. In embodiments where the coupler 56 is used, the spring lengths 70 and 90 should be selected so as to define a gap (not numbered) between each respective helical body in the extended configurations. The gap defines a space for the placement of the coupler 56. In other words, the gap should be configures so that the helical bodies 72 and 92 do not contact the coupler 56 during extension.

Another implementation of the present disclosure is a method for assembling a landing gear. The method includes first constructing the first and second springs 60 and 80 from a metallic wire or rod. The required number of coils is formed into the wire or rod to define the spring member. The first and second ends 52 and 54 of the wire or rod extend outward from the first and second spring member 70 and 90 and can be formed into attachments members, such as hooks, that are sized to receive the elongate pins 40a and 40b. As needed the optional coupler 56 can be secured to the elongate members of each spring so as to prevent the elongate members from contacting each other during use as noted above. Then, the formed first and second springs 60 and 80 can be installed on the landing gear assembly as the spring assembly 50. Alternatively, the first and second springs 60 and 80 can be attached to the elongate pins 40a and 40b, then the first and second springs 60 and 80 and the elongate pins 40a and 40b can be installed in the landing gear assembly. Other components of the landing gear, such as the locking brace and drag brace are assembled.

The method for assembling the landing gear includes other steps as well. For instance, in one example, the method includes coupling the first side brace 26 to the shock strut 22, and coupling the locking brace 30 to the shock strut 22 and the first side brace 26. The spring assembly 50 can be attached to the locking brace 30 and the first side brace 26 as illustrated in FIG. 2. The pins 40a and 40b are located in the respective braces 26 and 30 at this point. A spring stretching tool (not shown) is used to extend the spring assemblies from a free length to installed or pin-pin length for installation on the braces 26 and 30. Prior to attaching the spring assemblies to the stretching tool, both helical bodies and elongate members are mounted to the spring ends along with the optional coupler. Then, the stretching tool is located between the ends (of each spring assembly) so as to stretch both the spring assembles to the desired "pin to pin" length. Next, the tool and stretched springs are offered up to both the pins installed in the braces 26 and 30 at the same time and the spring ends are slid onto the pins. Thus, it can be said that during the first end 52 of the spring assembly 50 is attached to the locking brace 30, and the second end 54 of the spring assembly 50 to the first side brace 26, which can occur simultaneously. The second spring assembly would be attached similarly as well. In alternative methods, the spring assemblies can be attached to the pins sequentially. In accordance with the alternative embodiment, it can be said that during the ends of the spring assembly 50 are attached to the locking brace 30 and the first side brace 26. Then, the ends of the spring assembly 70, are attached to the locking brace 30 and the first side brace 26. In still alternative methods, each respective end can be attached to the respectively brace 26 and 30 sequentially. It should be appreciated that the methods described herein encompass initial manufacturing of the landing gear 20 as well as maintenance and/or repair of the landing gear 20, such as when the spring assembly 50 is being replaced on an in-service aircraft.

The spring assembly 50 as described herein has several advantageous features when installed in the landing gear. As assembled and placed in the land gearing, the spring assembly 50 can reduce working stress on the springs and improve fatigue life. For instance, when using single springs independently attached to the side brace of the landing gear, common resonant frequencies between adjacent springs create possible contact events, thereby increasing working stress on the springs. Because resonant frequency issues are minimized when utilizing the spring assembly as described herein, working stresses on the individual springs are reduced and fatigue life of the spring assembly 50 as installed is improved. Further, as the number of spring assemblies can be increased using this design negating the need for a highly loaded spring that reduces working stresses of each individual spring.

A landing gear is described as one implementation for using the spring assemblies as described herein. It should be appreciated that the spring assemblies can be used with other aircraft components where springs are used to control deployment of components and the like. For instance, the spring assembly can be used in systems that control deployment of compartments and hatch covers and the like.

What is claimed is:

1. A spring assembly elongate along a longitudinal direction, the spring assembly comprising:
    a first unitary spring that includes a first spring member and a first elongate member that extends from the first spring member along the longitudinal direction; and
    a second unitary spring including a second spring member and a second elongate member that extends from the second spring member along the longitudinal direction,
    wherein the second elongate member extends through the first spring member, and the first elongate member extends through the second spring member such that the first and second spring members are spaced apart with respect to each other along the longitudinal direction.

2. The spring assembly of claim 1, wherein the first and second spring members do not contact the first and second elongate members.

3. The spring assembly of claim 1, wherein each spring includes a first end and a second end spaced opposed to the first end, the first and second ends of each spring include an attachment member configured to be moveably coupled to respective structures.

4. The spring assembly of claim 3, wherein each attachment member is a hook configured to attach to an elongate pin.

5. The spring assembly of claim 1, wherein the spring assembly includes a first end, a second end spaced from the first end in a longitudinal direction, and a length that extends from the first end to the second, wherein the length of the spring assembly increases as the spring assembly transitions from a first configuration into a second extended configuration.

6. The spring assembly of claim 5, wherein each spring member is a coil and each elongate member is a linear rod.

7. The spring assembly of claim 6, wherein each coil elongates when the spring assembly is in the second extended configuration.

8. The spring assembly of claim 1, wherein the first spring and the second spring are duplicate parts.

9. The spring assembly of claim 1, wherein the first spring and second spring each have approximately the same diameter and spring rate.

10. The spring assembly of claim 1, wherein the first and second spring assemblies attach to a structure at the same points and are centered about common central axis.

11. A method, comprising:
coupling a spring assembly between a side brace and a locking brace of a landing gear assembly, the spring assembly having a first spring that includes a first spring member and a first elongate member, and a second spring that includes a second spring member and a second elongate member, wherein the second elongate member extends through the first spring member, and first elongate member extends through the second spring member.

12. The method of claim 11, wherein the coupling step includes:
attaching a first end of the spring assembly to the side brace; and
attaching a second end of the spring assembly to the locking brace.

13. The method of claim 12, wherein each spring includes first and second opposed ends, and the first attaching step includes attaching respective first ends of the first and second springs to a first pin; and
attaching the first pin to the side brace.

14. The method of claim 12, wherein the second attaching step includes attaching respective second ends of the first and second springs to a second pin; and
attaching the second pin to the locking brace.

15. The method of claim 11, further comprising the step of extending, via a tool, each spring from a first length to an extended length.

16. The method of claim 11, further comprising the step of placing a coupler between the elongate members of each spring so as to prevent the elongate member from contacting each other.

17. A landing gear configured to transition between a deployed configuration and a retracted configuration in a compartment of an aircraft, the landing gear comprising a spring assembly, the spring assembly comprising:
a first spring that includes a first spring member and a first elongate member that extends from the first spring member along the longitudinal direction; and
a second spring including a second spring member and a second elongate member that extends from the second spring member along the longitudinal direction,
wherein the second elongate member extends through the first spring member, and the first elongate member extends through the second spring member such that the first and second spring members are spaced apart with respect to each other along the longitudinal direction.

18. The landing gear of claim 17, wherein the first and second spring members do not contact the first and second elongate members.

19. The landing gear of claim 17, wherein each spring includes a first end and a second end spaced opposed to the first end, the first and second ends of each spring include an attachment member configured to be moveably coupled to respective structures.

20. The landing gear of claim 19, wherein each attachment member is a hook configured to attach to an elongate pin.

* * * * *